(12) United States Patent
Kim

(10) Patent No.: US 6,402,197 B1
(45) Date of Patent: Jun. 11, 2002

(54) STEERING COLUMN OF POWER STEERING APPARATUS

(75) Inventor: Min-Jung Kim, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/973,704

(22) Filed: Oct. 11, 2001

(30) Foreign Application Priority Data

Dec. 26, 2000 (KR) ........................................ 2000-81526

(51) Int. Cl.⁷ ................................................. B62D 1/16
(52) U.S. Cl. ...................... 280/779; 74/492; 280/89; 280/89.11
(58) Field of Search ............................. 280/779, 89.11, 280/89; 74/492

(56) References Cited

U.S. PATENT DOCUMENTS 3,654,820 A * 4/1972 Shachter ........................ 74/495

FOREIGN PATENT DOCUMENTS

| GB | 486692 | * 6/1938 | .................. 280/89 |
| JP | 56-163961 | * 12/1981 | .................. 74/492 |
| NO | 61586 | * 10/1939 | .................. 280/89 |

* cited by examiner

Primary Examiner—Eric Culbreth
(74) Attorney, Agent, or Firm—Birch, Stewart, Kolasch & Birch, LLP

(57) ABSTRACT

A steering column of a power steering apparatus constructed with a tube fixed on the steering column and a steering shaft inserted inside of the tube to transmit manipulation force to a steering linkage in response to manipulation of a steering wheel, said steering column including a screw part formed on the external surface of the steering shaft, guide rails extending from the inside surface of the tube, forward the screw part and having a length correspondingly to the length of the screw part, and a ring in screw engagement with the screw part for moving along the guide rail and the steering shaft.

5 Claims, 5 Drawing Sheets

STEERING COLUMN OF POWER STEERING APPARATUS

BACKGROUND OF THE INVENTION

1. Field of the Invention

The present invention relates to a steering column of a power steering apparatus.

2. Description of the Invention

In general, a power steering apparatus is used for satisfying consumers demand to carry out light, swift steering operations. As shown in FIG. 1, the manipulation force generated by the steering wheel 2 is transmitted through a steering column 4 to a gear box 6 and further transmitted through steering linkage including a pitman arm 8 to the front wheels. At this time, the hydraulic pressure generated by driving an oil pump 10 decreases the manipulation force of the steering wheel 2. An oil pump 10 supplies oil from an oil tank 12 through a hydraulic line.

As shown in FIG. 2, inside a housing 14 of the gear box 6, large and small torsion bars 16 with two different spring constants are integrally installed at the end of steering shaft 15 of the steering column 4, and a control valve with two pairs of flappers 18, 18' is installed to utilize the twist of the torsion bars 16 made by the manipulation force of the steering wheel 2 and the friction between the front wheels and earth to change the hydraulic route by the flappers.

Accordingly, the power steering apparatus thus constructed has a pressure-torque characteristic determined by the thickness of the torsion bars 16, the end shape and size of the steering shaft 15.

Generally, if the torsion bars 16 are thin and if the characteristic determined by the end shape and size of the steering shaft 15 is light, a weak manipulation force may manipulate the steering wheel but cause a deterioration in its on-center feeling. In other words, the steering wheel may be rotated by a slight force but may create a problem of instability in the steering force when a vehicle is driven at a high speed.

In addition, if the torsion bars are thick and the characteristic of the end of the steering shaft 15 is heavy, there may be another problem of requiring greater manipulation force in spite of its greater on-center feeling.

Furthermore, if the pressure-torque characteristic is made light and if thin torsion bars are used to achieve a slight manipulation force, the steering wheel is sensitively reacted to external turbulences transmitted from tires of a driven car to thereby cause a problem of losing stability in operations.

SUMMARY OF THE INVENTION

It is an object of the present invention to solve the aforementioned problems and provide a steering column of a power steering apparatus which can improve on-centering feeling while a car is driven at a high speed, and can make its manipulation force lighter while the car is driven at a low speed or parked for its complete stop.

In order to accomplish the aforementioned object of the present invention, there is provided a steering column of a power steering apparatus constructed with a tube fixed at the steering column and a steering shaft inserted at the inner side of the tube to transmit the manipulation force to steering linkage according to manipulation of a steering wheel. The steering column comprises:

a screw part formed at the external surface of the steering shaft;

guide rails installed at the internal side of the tube correspondingly to the screw part; and a ring coupled with a screw of the screw part for moving lengthwise along the guide rail to the steering shaft, where protruded parts are respectively formed at the lengthwise center of the guide rail and the ring. It is preferable that the guide rail and the ring are made of a plastic material with a predetermined degree of elasticity.

It is preferable that stoppers are fastened at both sides of the guide rail to restrict the ring in the distance of its motion.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, a preferred embodiment of the present invention will be described in detail with reference to accompanying drawings.

Figure 1:
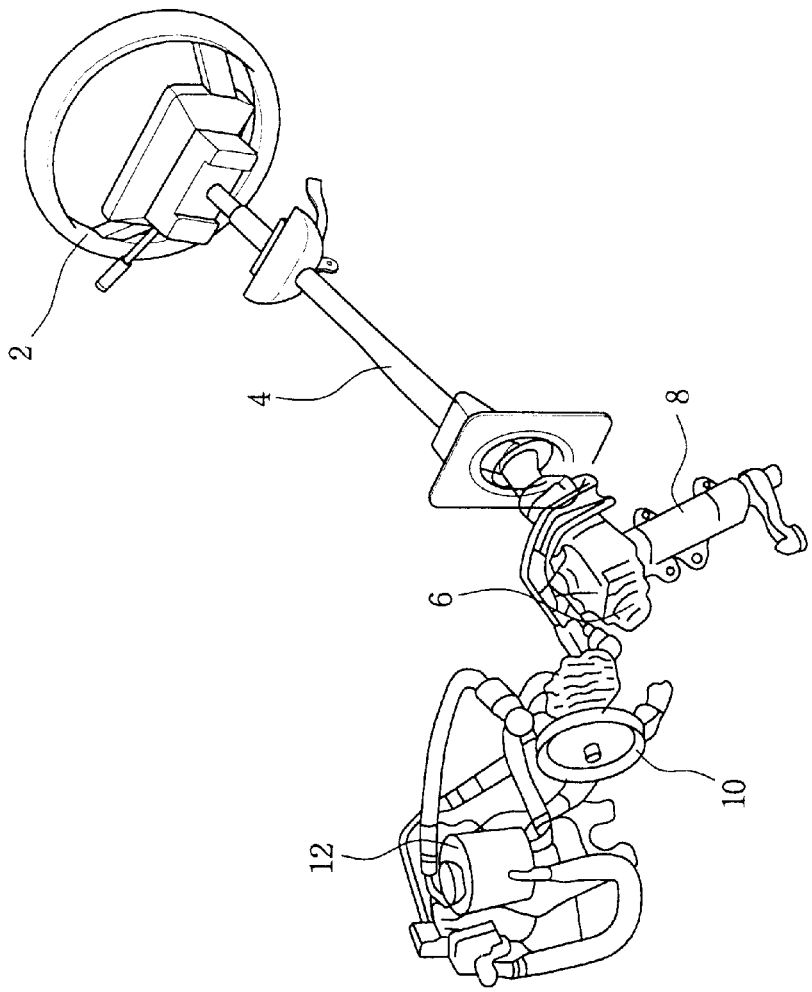
FIG. 1 is a structural view for illustrating a conventional power steering apparatus.
Figure 2:
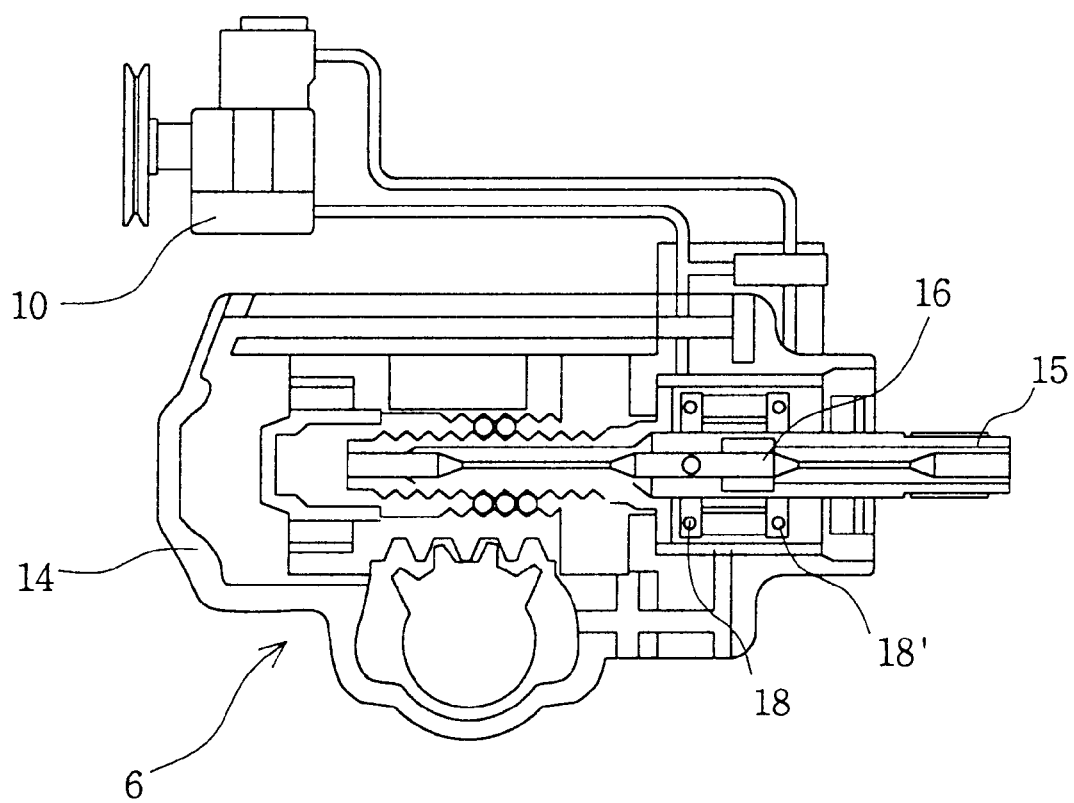
FIG. 2 is a structural view for illustrating an embodiment of a gear box of a conventional power steering apparatus.
Figure 3:
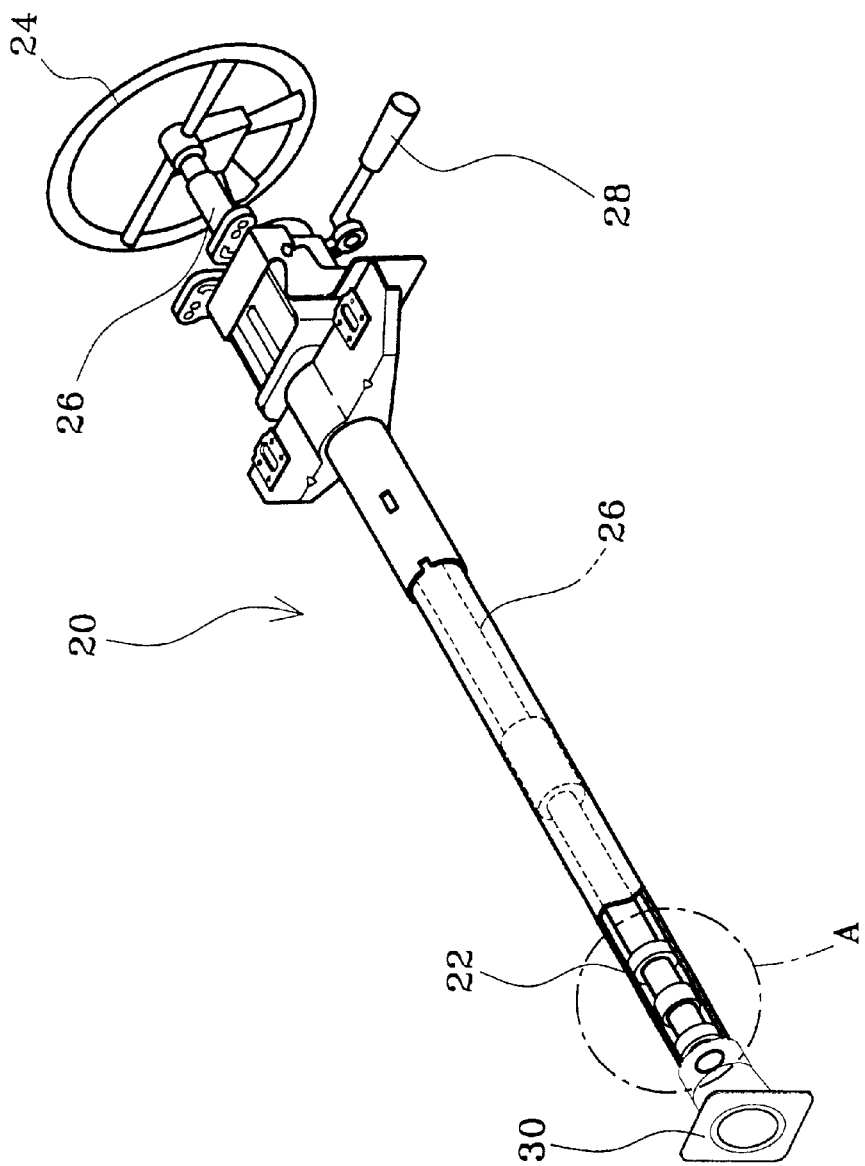
FIG. 3 is a perspective view for illustrating a steering column of a power steering apparatus in accordance with the present invention.

FIG. 3 is a perspective view for illustrating a steering column of a power steering apparatus in accordance with the present invention. As shown in FIG. 3, the steering column 20 of the present invention includes a tube 22 fixed at the housing of a gear box (not shown) and a steering shaft 26 inserted at the internal side of the tube 22 for transmitting the manipulation force to the steering linkage according to the manipulation of a steering wheel 24.

A tilt lever 28 is mounted at one side of the steering column 20, and the tube 22 is fixed at the housing of the gear box with a cover bracket 30.

Figure 4:
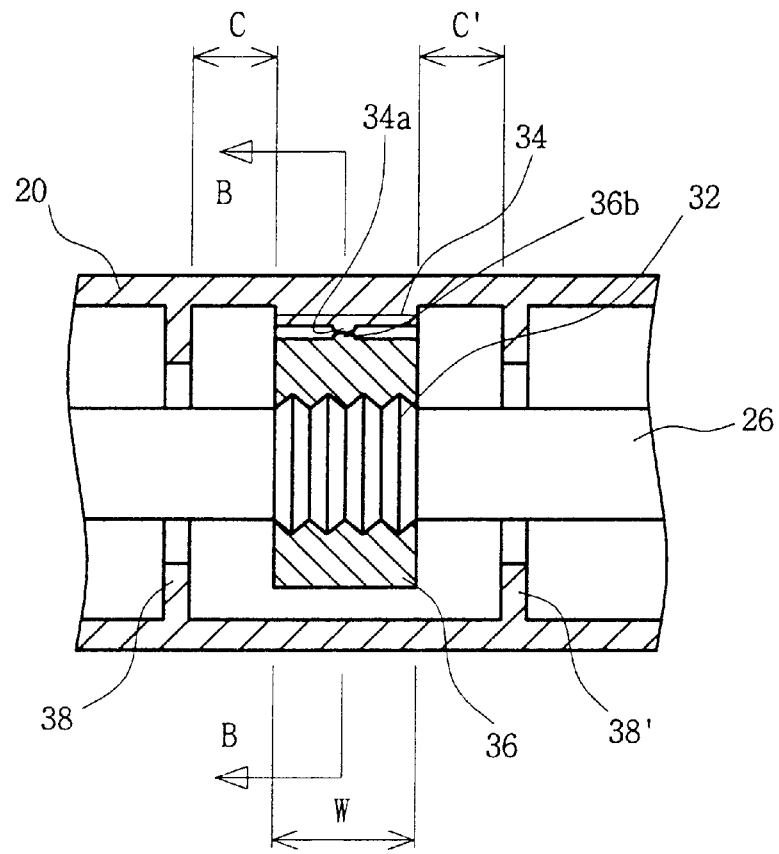
FIG. 4 is a longitudinal, cross-sectional view for illustrating part A shown in FIG. 3.
Figure 5:
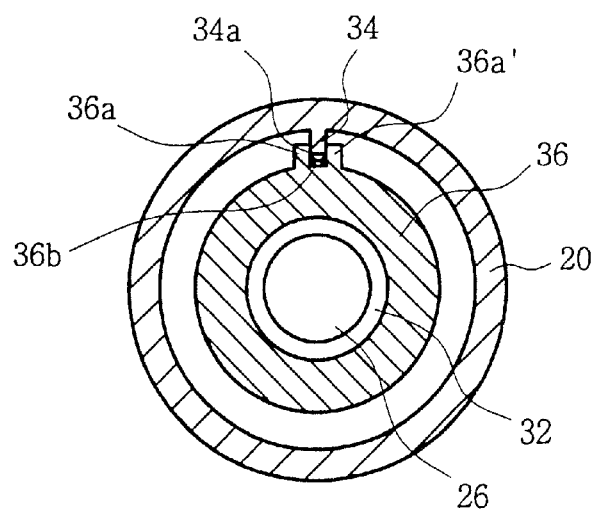
FIG. 5 is a cross-sectional view along with an arrow marked as line B—B shown in FIG. 4.

As shown in FIGS. 4 and 5, a screw part 32 is formed at the outer side of the steering shaft 26 close to the cover bracket 30, and a guide rail 34 is positioned at the internal side of the tube 22 correspondingly to the screw part 32. A ring 36 is screwed to the screw part 32. In addition, stoppers 38, 38' are mounted at both sides of the guide rail 34.

At this time, the guide rail 34 may be protruded at the internal side of the tube 22 or fixed at the internal side of the tube 22 by welding or fastening with an additional member. It may be in the shape of a rectangular rod coupled lengthwise along the tube 22. It is preferable that the guide rail 34 is made of an elastic plastic material. There is a protruded part 34a at the center of the guide rail 34 in length and in width.

A nut is positioned at the internal side of the ring 36 to be screwed with the screw part 32, and hitching jaws 36a, 36a' are protruded at the external side of the ring 36. The guide rail 34 is inserted between the two hitching jaws. Therefore, if the steering shaft 26 is rotated to one direction, the ring 36 will move only along a length of the steering shaft. A protruded part 36b is made between the hitching jaws 36a, 36a' to be closely adhered to the protruded part 34a. It is preferable that the ring 36 and the hitching jaws 36a, 36a' formed thereon should be made identical to the guide rail 34 in length. It is also preferable that the ring 36 is made of an elastic plastic material.

The stoppers 38, 38' are made in the shape of a rectangle. When the steering shaft 26 is completely rotated to one direction, the lateral side of the ring 36 will hit against the stoppers 38, 38' to prevent the steering shaft from rotating any further. The gaps C, C' to the guide rail 34 are smaller than the width W of the ring 36. As a result, the ring 36 is always screwed to the screw part 32 of the steering shaft even if the lateral part of the ring contacts the stoppers 38, 38'.

The stoppers 38, 38' protruded at the internal side of the tube 22 and are fixed at the internal side of the tube 22 by welding or fastening with an additional member. Thus they are coupled along the internal circumference of the tube 22 in the shape of rings.

When the steering column of the power steering apparatus of the present invention thus constructed, as shown in FIG. 4, is at its neutral state, the protruded parts 34a of the guide rail 34 will be in contact with the protruded part 36b of the ring 36, resulting in an increase in manipulation torque. Therefore, when a car is driven at a high speed, the on-center feeling of the car may be stabilized or improved at its neutral state.

Furthermore, if the steering shaft 26 is rotated, the ring 36 moves to prevent the protrudes parts from being in contact to decrease its manipulation force and to make the steering operations smooth.

Figure 6:
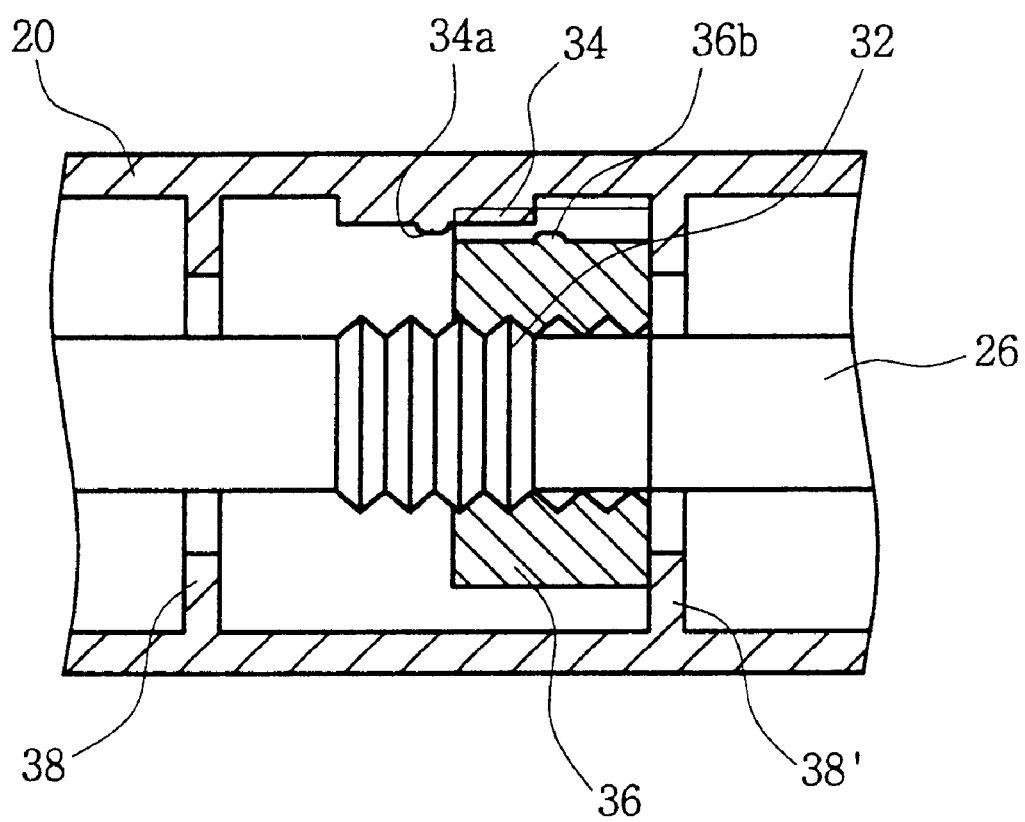
FIG. 6 illustrates a steering column of the present invention in its operational state.

As shown in FIG. 6, if the steering shaft 26 is rotated completely to one direction at its neutral state, the lateral side of the ring 36 contacts the stopper 38 not to get the steering shaft 26 rotated any further. since even identical car have different positions of the stoppers in the gear box to determine internal/external external steering angles of tires, different types of the gear boxes have been needed. However, since the stoppers 38, 38' are connected with the steering column in the present invention, the aforementioned problem of the conventional steering column can be solved.

Advantageously, the guide rail 34 and the ring 36 are made of an elastic plastic material, so that it may be possible to lightly control the steering wheel.

The present invention is not to be limited to the preferred embodiment described above, but a variety of modifications can be made thereto.

In other words, there are advantages in the steering column of the power steering apparatus of the present invention in that the on-centering feeling is stabilized at its neutral state, while a car is driven at high speed, in that only a slight force is required for low speed steering operations and parking of a car and in that different types of gear boxes are not needed for the same car.

What is claimed is:

1. A steering column of a power steering apparatus constructed with a tube fixed on the steering column and a steering shaft inserted inside of the tube to transmit manipulation force to a steering linkage in response to manipulation of a steering wheel, said steering column comprising:

a screw part formed on the external surface of the steering shaft;

a guide rail extending from the inside surface of the tube, toward the screw part and having a length correspondingly to the length of the screw part; and a ring in screw engagement with the screw part for moving along the guide rail and the steering shaft.

2. The steering column, as defined in claim 1, wherein the guide rail and the ring are made of a plastic material with a predetermined degree of elasticity.

3. The steering column, as defined in claim 1, wherein stoppers are installed within the tube and on opposite sides of the guide rail for restricting the movement of the ring along the steering shaft.

4. The steering column, as defined in claim 1, wherein protruding parts extend towards each other from the middle of the guide rail and from the middle of the ring.

5. The steering column, as defined in claim 1, wherein jaws extend from the ring lateral to the guide rail for guiding the guide rail therebetween.

* * * * *